US010446861B2

(12) United States Patent
Desai et al.

(10) Patent No.: US 10,446,861 B2
(45) Date of Patent: Oct. 15, 2019

(54) FLOWING ELECTROLYTE FUEL CELL WITH IMPROVED PERFORMANCE AND STABILITY

(71) Applicant: Palo Alto Research Center Incorporated, Palo Alto, CA (US)

(72) Inventors: Divyaraj Desai, Sunnyvale, CA (US); Vedasri Vedharathinam, San Jose, CA (US); Martin Joseph Sheridan, Redwood City, CA (US); Ashish V. Pattekar, Cupertino, CA (US); Craig Eldershaw, Belmont, CA (US); Rajesh Kumar Padmarajan, Mountain View, CA (US); Gabriel Iftime, Dublin, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 166 days.

(21) Appl. No.: 14/981,104

(22) Filed: Dec. 28, 2015

(65) Prior Publication Data

US 2017/0187054 A1 Jun. 29, 2017

(51) Int. Cl.
*H01M 8/00* (2016.01)
*H01M 8/04276* (2016.01)
(Continued)

(52) U.S. Cl.
CPC ..... *H01M 8/04283* (2013.01); *H01M 4/8626* (2013.01); *H01M 8/023* (2013.01);
(Continued)

(58) Field of Classification Search
CPC .. H01M 4/8626; H01M 8/04283; H01M 8/02; H01M 8/2455; H01M 8/188; Y02E 60/528
See application file for complete search history.

(56) References Cited

U.S. PATENT DOCUMENTS 6,793,711 B1 * 9/2004 Sammells ............ B01D 69/141
204/400
2001/0004501 A1 * 6/2001 Yi ...................... H01M 8/04089
429/431
(Continued)

OTHER PUBLICATIONS

A. Verma et al., "Manganese dioxide as a cathode catalyst for a direct alcohol or sodium borohydride fuel cell with a flowing alkaline electrolyte," Science Direct, Journal of Power Sources 141, pp. 30-34, 2005.
(Continued)

*Primary Examiner* — Cynthia H Kelly
*Assistant Examiner* — Monique M Wills
(74) *Attorney, Agent, or Firm* — Fay Sharpe LLP

(57) ABSTRACT

A flowing electrolyte fuel cell system design (DHCFC-Flow) is provided. The use of a flowing oxygen-saturated electrolyte in a fuel cell offers a significant enhancement in the cell performance characteristics. The mass transfer and reaction kinetics of the superoxide/peroxide/oxide ion (mobile oxygen ion species) in the fuel cell are enhanced by recirculating an oxidizing gas-saturated electrolyte. Recirculating oxygen-saturated electrolyte through a liquid channel enhances the maximal current observed in a fuel cell. The use of a oxygen saturated electrolyte ensures that the reaction kinetics of the oxygen reduction reaction are fast and the use of convection ameliorates concentration gradients and the diffusion-limited maximum current density. The superoxide ion is generated in situ by the reduction of the oxygen dissolved in the gaseous electrolyte. Also, a dual porosity membrane allows the uniform flow of fuel (e.g., methane) on the fuel side, without allowing phase mixing. The capillary pressure for liquid intrusion into the gas phase and vice versa is quite large, estimated to be 1-10 psi. This makes it easier to control the fluctuations in gas/liquid velocity which might otherwise lead to phase mixing and the loss of fuel cell performance. In one variation, a dual-porosity membrane structure is incorporated in the system to allow uniform flow of fuel and prevent mixing of fuel with a liquid electrolyte.

29 Claims, 14 Drawing Sheets

(51) Int. Cl.
  *H01M 4/86* (2006.01)
  *H01M 8/2455* (2016.01)
  *H01M 8/18* (2006.01)
  *H01M 8/22* (2006.01)
  *H01M 8/023* (2016.01)

(52) U.S. Cl.
  CPC ............ *H01M 8/188* (2013.01); *H01M 8/22* (2013.01); *H01M 8/2455* (2013.01); *Y02E 60/528* (2013.01)

(56) References Cited

U.S. PATENT DOCUMENTS

| | | | | |
|---|---|---|---|---|
| 2003/0170524 | A1* | 9/2003 | Kordesch | H01M 8/00 429/409 |
| 2009/0092882 | A1* | 4/2009 | Kjeang | H01M 4/8605 429/506 |
| 2010/0119883 | A1* | 5/2010 | Friesen | H01M 4/8605 429/429 |
| 2011/0027623 | A1* | 2/2011 | Coey | H01M 4/8673 429/10 |
| 2016/0064763 | A1 | 3/2016 | Sahu | |

OTHER PUBLICATIONS

Ranga S. Jayashree et al., "Air-Breathing Laminar Flow-Based Direct Methanol Fuel Cell with Alkaline Electrolyte," Electrochemical and Solid-State Letters, 9 (5) pp. A252-A256, 2006.

E. R. Choban, "Membraneless laminar flow-based micro fuel cells operating in alkaline, acidic, and acidic/alkaline media," Science Direct, Electrochimica Acta 50, pp. 5390-5398, 2005.

Cormac O. Laoire et al., "Elucidating the Mechanism of Oxygen Reduction for Lithium-Air Battery Applications," J. Phys. Chem. C, vol. 113, No. 46, American Chemistry Society, pp. 20127-20134, 2009.

Maria Antonietta Casadei et al., Activation of Carbon Dioxide by Electrogenerated Superoxide Ion: A New Carboxylating Reagent, J. Phys. Chem., vol. 61, No. 1, American Chemical Society, pp. 380-383, 1996.

John Newman et al., "Electrochemical Systems," Third Edition, pp. 382-393, 2004.

Maria Antonietta Casadei et al., "Activation of Carbon Dioxide by Electrogenerated Superoxide Ion: A New Carboxylating Reagent," American Chemical Society, J. Org. Chem. vol. 61, No. 1, pp. 380-383, 1996.

Marisa C. Buzzeo, "Kinetic Analysis of the Reaction between Electrogenerated Superoxide and Carbon Dioxide in the Room Temperature Ionic Liquids 1-Ethyl-3-methylimidazolium Bis(trifluoromethylsulfonyl)imide and Hexyltriethylammonium Bis(trifluoromethylsulfonyl)imide," American Chemical Society, j. Phys. Chem., B. vol. 108, No. 12, pp. 3947-3954, 2004.

* cited by examiner

FLOWING ELECTROLYTE FUEL CELL WITH IMPROVED PERFORMANCE AND STABILITY

This invention was made with U.S. Government support under government contract DE-AR0000500 awarded by the U.S. Department of Energy (DOE)/ARPA-E under the Reliable Electricity Based on ELectrochemical Systems (REBELS) program. The Government has certain rights in this invention.

BACKGROUND

Direct hydrocarbon fuel cells (DHCFCs) offer an environment-friendly method to produce electricity directly from fossil fuels at a higher efficiency than fuel combustion processes without necessitating the use of a reformer to convert the fuel to hydrogen. Conventional proton exchange membrane (PEM) fuel cells require pure hydrogen fuel to generate electricity by the conduction of hydrogen ($H^+$) ions (i.e., protons) across the electrolyte membrane towards the cathode (oxygen side electrode) where they react with the oxygen to complete the electro-chemical circuit. In contrast to this, DHCFCs operate on the principle of conducting oxygen ions across the electrolyte—in the opposite direction compared to the proton conduction in a PEM fuel cell—and are thus fuel-agnostic since the reaction between the oxygen ions and the fuel actually happens on the fuel electrode (anode) of the fuel cell. Thus, most conventional hydrocarbon fuels can be used directly in a DHCFC without first having to convert (reform) them to pure hydrogen, which is a significant advantage due to obviating the need for an established hydrogen infrastructure to operate DHCFCs. Contemporary DHCFC designs such as Solid Oxide fuel Cells (SOFCs) already exist today, but they operate at high temperatures (T>600° C.), and finding appropriate materials that work in these conditions is a significant challenge. Moreover, these high temperature systems are typically operated in a 'constantly-on' fashion in order to reduce the chances of premature failure associated with thermal cycling and the resulting thermal expansion and contraction associated with turning these systems on and off.

Intermediate temperature DHCFCs (operating at T<300° C.) therefore have the potential to improve the implementation of fuel cells for a variety of electrochemical energy conversion applications, from stationary and distributed electricity generation in the range of 10's or 100's of kilowatts (kW) to megawatts (MW), and also for smaller-scale applications such as auxiliary power units (APUs) in the range of <10 KW and for vehicle motive power applications that are typically in the range of about 30 to 80 kW.

An intermediate temperature DHCFC, operating at <300° C., is disclosed in U.S. patent application Ser. No. 14/472,195 (filed Aug. 28, 2014), entitled "Apparatus and Method Associated with Reformer-less Fuel Cell" and this co-pending patent application is hereby incorporated herein by reference in its entirety However, the performance characteristics of intermediate temperature DHCFCs based on previous designs can be adversely impacted by the limited rate of transport of the ionic active species (i.e. superoxide/oxide/peroxide ion) in the electrolyte. For example, the performance characteristics (current density and specific power) of the DHCFC can be negatively affected by reduced concentration of oxygen in the electrolyte, or by the low rate of diffusion/transport of the oxygen ion through the electrolyte.

Metal-air batteries operate at ambient temperatures and are positioned as energy storage devices with volumetric and gravimetric energy densities in excess of contemporary Li-ion batteries. While redox anodic reactions are typically fast, the energy efficiency of a metal-air battery is limited by the kinetics of the oxygen reduction reaction (ORR). Metal-air batteries are similar to fuel cells in some sense, since they both involve the transport of a mobile oxygen species and both are current limited by the ORR's sluggishness. Also, the analysis of the ORR in fuel cells can be extended to battery systems as well. It is known [Laoire, Mukerjee et al, Journal of Physical Chemistry C, 2009] that the mass-transfer limiting current of the ORR is limited by the solubility of oxygen in the dissolved phase.

BRIEF DESCRIPTION

In one aspect of the presently described embodiments, an electrochemical fuel cell system employing the use of a fuel for electrochemical energy conversion and at least one fuel cell is provided and, the at least one fuel cell comprises an inlet portion configured to receive liquid electrolyte in a saturated state, a flow path configured to facilitate a flow of the liquid electrolyte, and an outlet portion configured to provide an exit for the flowing liquid electrolyte in a depleted state.

In another aspect of the presently described embodiments, the liquid electrolyte is saturated with at least one of oxygen, oxygen ions or a fuel.

In another aspect of the presently described embodiments, the system further comprises a mechanism configured to saturate the liquid electrolyte with oxygen, provide the oxygen-saturated liquid electrolyte to the inlet portion, and receive the oxygen-depleted liquid electrolyte liquid from the outlet portion.

In another aspect of the presently described embodiments, oxygen ions are generated in-situ and incorporated into the flow of the liquid electrolyte In another aspect of the presently described embodiments, carbon-containing products of fuel cell reaction ($CO_x$, x=1, 2) are dissolved in the liquid electrolyte and carried away for carbon capture and sequestration.

In another aspect of the presently described embodiments, the system further comprises a dual-porosity membrane configured to allow uniform flow of fuel on a fuel side of the at least one fuel cell and prevent mixing of the fuel with the liquid electrolyte.

In another aspect of the presently described embodiments, the membrane comprises a porous gas diffuser bonded to a catalyst-coated nanoporous layer.

In another aspect of the presently described embodiments, the gas diffuser has pores with diameters in a range of approximately 5-100 microns.

In another aspect of the presently described embodiments, the gas diffuser has a thickness of approximately 5 millimeters.

In another aspect of the presently described embodiments, the catalyst-coated nanoporous layer has pores with diameters in a range of approximately 5 nanometers to 10 microns.

In another aspect of the presently described embodiments, the catalyst-coated nanoporous layer comprises a nanoporous layer having a thickness of approximately 50 microns and a coating layer of approximately 1 micron.

In another aspect of the presently described embodiments, the nanoporous layer comprises at least one of an anodized aluminum oxide, a porous polymer including Teflon, expanded or porous PTFE (polytetrafluoroethylene), a polyimide including porous Kapton, or a porous ceramic including porous alumina or porous zirconia.

In another aspect of the presently described embodiments, the nanoporous layer is surface treated to be nonwett-able by the electrolyte.

In another aspect of the presently described embodiments, the coating layer comprises Teflon (PTFE) or a non-stick type coating.

In another aspect of the presently described embodiments, the at least one fuel cell uses a gaseous fuel.

In another aspect of the presently described embodiments, the at least one fuel cell uses a liquid fuel.

In another aspect of the presently described embodiments, the at least one fuel cell uses a solid fuel.

In another aspect of the presently described embodiments, the electrolyte is an ionic liquid.

In another aspect of the presently described embodiments, the ionic liquid is at least one of 1-ethyl, 3-methyl imidazolium trifluoromethanesulfonate [emim][OTf], 1-ethyl, 3-methyl imidazolium bis(trifluoromethylsulfonylimide) [emim][TFSI], butyl trimethylammonium bis(trifluoromethylsulfonylimide) [btma][TFSI], 1-propyl, 3-methylpyrrolidinium bis(trifluorosulfonylimide) [pmpy][TFSI], 1-butyl, 3-methylpyrrolidinium bis(trifluorosulfonylimide) [bmpy][TFSI], 1-ethyl-3-methylimidazolium dicyanamide [emim][-DCA], 1,2-dimethyl-3-propylimidazolium bis(trifluoromethylsulfonyl)imide [mmpim][TFSI], and 1-ethyl-2,3-dimethylimidazolium bis trifluoromethylsulfonyl)imide.

In another aspect of the presently described embodiments, an operating temperature is in a range of approximately 100-400° C.

In another aspect of the presently described embodiments, an operating temperature is an ambient temperature in a range of 0-100° C.

In another aspect of the presently described embodiments, the system comprises a stack of fuel cells.

In another aspect of the presently described embodiments, the system comprises a stack of fuel cells electrically connected in a parallel configuration to maximize current delivering capability.

In another aspect of the presently described embodiments, the system comprises a stack of fuel cells electrically connected in a series configuration to maximize voltage delivering capability.

In another aspect of the presently described embodiments, the system comprises a stack of fuel cells electrically connected in a series-parallel combination configuration to achieve the desired voltage and current delivering capability.

In another aspect of the presently described embodiments, an electrochemical fuel cell system employing the use of a fuel for electrochemical energy conversion and at least one fuel cell, the at least one fuel cell comprises a fuel inlet, a fuel outlet, a liquid electrolyte, and, a dual-porosity membrane configured to allow uniform flow of fuel between the fuel inlet and fuel outlet to prevent mixing of the fuel with the liquid electrolyte.

In another aspect of the presently described embodiments, the membrane comprises a porous gas diffuser bonded to a catalyst-coated nanoporous layer.

In another aspect of the presently described embodiments, the gas diffuser has pores with diameters in a range of approximately 5-100 microns.

In another aspect of the presently described embodiments, the gas diffuser has a thickness of approximately 5 millimeters.

In another aspect of the presently described embodiments, the catalyst-coated nanoporous layer has pores with diameters in a range of approximately 5 nanometers to 1 micron.

In another aspect of the presently described embodiments, the catalyst-coated nanoporous layer comprises a nanoporous layer having a thickness of approximately 50 microns and a coating layer of approximately 1 micron.

In another aspect of the presently described embodiments, the nanoporous layer comprises at least one of an anodized aluminum oxide, a porous polymer including Teflon, expanded or porous PTFE (polytetrafluoroethylene), a polyimide including porous Kapton, or a porous ceramic including porous alumina or porous zirconia.

In another aspect of the presently described embodiments, the nanoporous layer is surface treated to be nonwettable by the electrolyte.

In another aspect of the presently described embodiments, the coating layer comprises Teflon (PTFE) or a non-stick type coating.

In another aspect of the presently described embodiments, a method for use in an electrochemical fuel cell system employing the use of a fuel for electrochemical energy conversion and at least one fuel cell, the method comprises receiving a liquid electrolyte in a saturated state, facilitating a flow of the liquid electrolyte in a flow path and allowing for an exit of the flowing liquid electrolyte in a depleted state.

In another aspect of the presently described embodiments, an electrochemical energy conversion system includes at least one rechargeable battery, the at least one rechargeable battery comprising an inlet portion configured to receive liquid electrolyte in a saturated state, a flow path configured to facilitate a flow of the liquid electrolyte and an outlet portion configured to provide an exit for the flowing liquid electrolyte in a depleted state, wherein the electrochemical system comprises a rechargeable battery using metal as the fuel and utilizing an oxygen-saturated flowing electrolyte as the liquid electrolyte.

DETAILED DESCRIPTION

According to the presently described embodiments, the use of convection/electrolyte flow helps eliminate concentrations gradients and further enhances the diffusional current in contemplated systems. Also, according to the presently described embodiments, improving the use of an oxygen-saturated electrolyte results in improved performance (specific power and energy) and energy efficiency of such systems.

For example, according to the presently described embodiments, an improved electrochemical fuel cell system is provided by use of flowing electrolyte to maximize fuel cell performance. In at least one form, the flowing electrolyte is first saturated with oxidant (oxygen) either in the molecular ($O_2$) form or in the ionic (oxygen ion such as superoxide, peroxide, oxide) form prior to flowing the electrolyte along the fuel-membrane support interface. In another form, the system uses a dual-porosity structure implementing a gas diffuser/catalyst layer to allow the use of gaseous fuels. In any form, buildup of reaction products and possible resulting degradation of fuel cell performance are prevented by carrying the reaction products away from the active reaction zone. For example, in one form, carbon containing products of fuel cell reaction ($CO_x$, where x=1,2) are dissolved in the liquid electrolyte and carried away for carbon capture and sequestration.

In this regard, more particularly, the presently described embodiments, in at least one form, use a flowing oxygen-saturated electrolyte in a fuel cell (or in another electrochemical energy conversion device, for example, a rechargeable battery) to offer a significant enhancement in the cell performance characteristics. Such embodiments seek to significantly enhance the mass transfer and reaction kinetics of the superoxide/peroxide/oxide ion (mobile species) in the fuel cell by recirculating a stream of the oxygen/oxygen ion saturated electrolyte. The maximum current density is calculated to be significantly larger than previously reported designs by recirculating an $O_2$-saturated electrolyte, which has not been explored in the prior art.

Figure 1A:
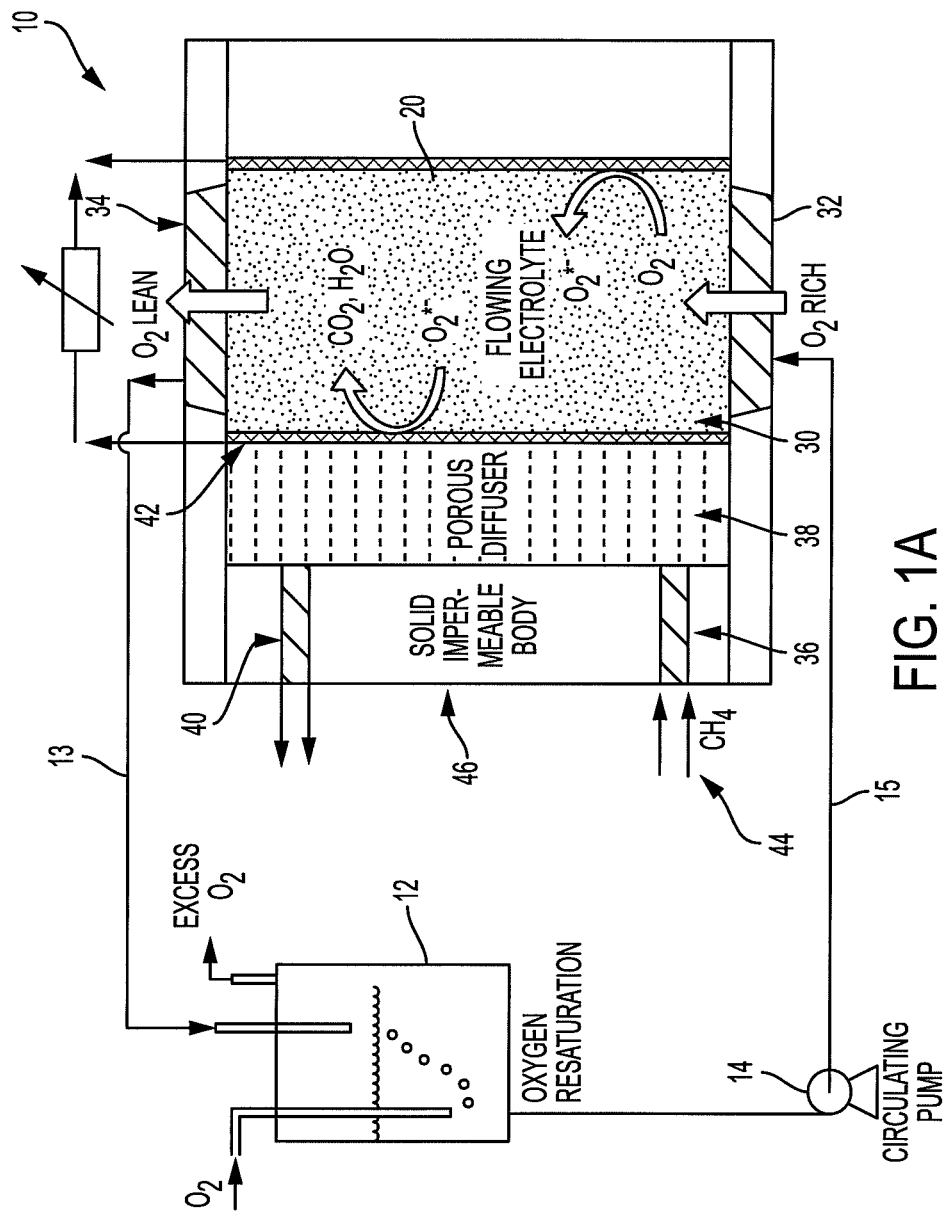
FIG. 1A is a block diagram of a fuel cell according to the presently described embodiments and FIG. 1B is a partial section showing a gas diffuser/catalyst layer according to the presently described embodiments.
Figure 2A:
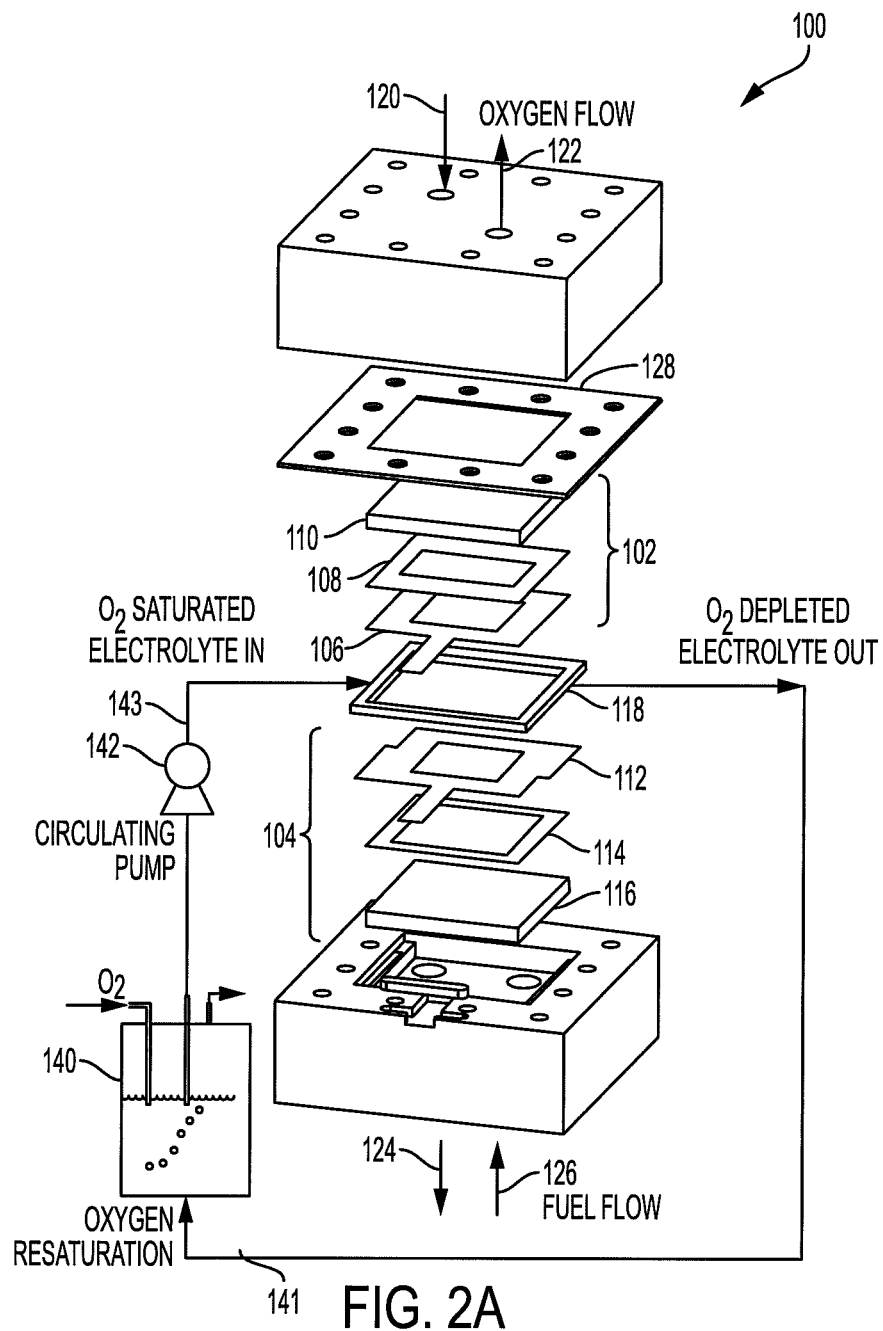
FIGS. 2A and 2B illustrate example implementations according to the presently described embodiments.
Figure 2B:
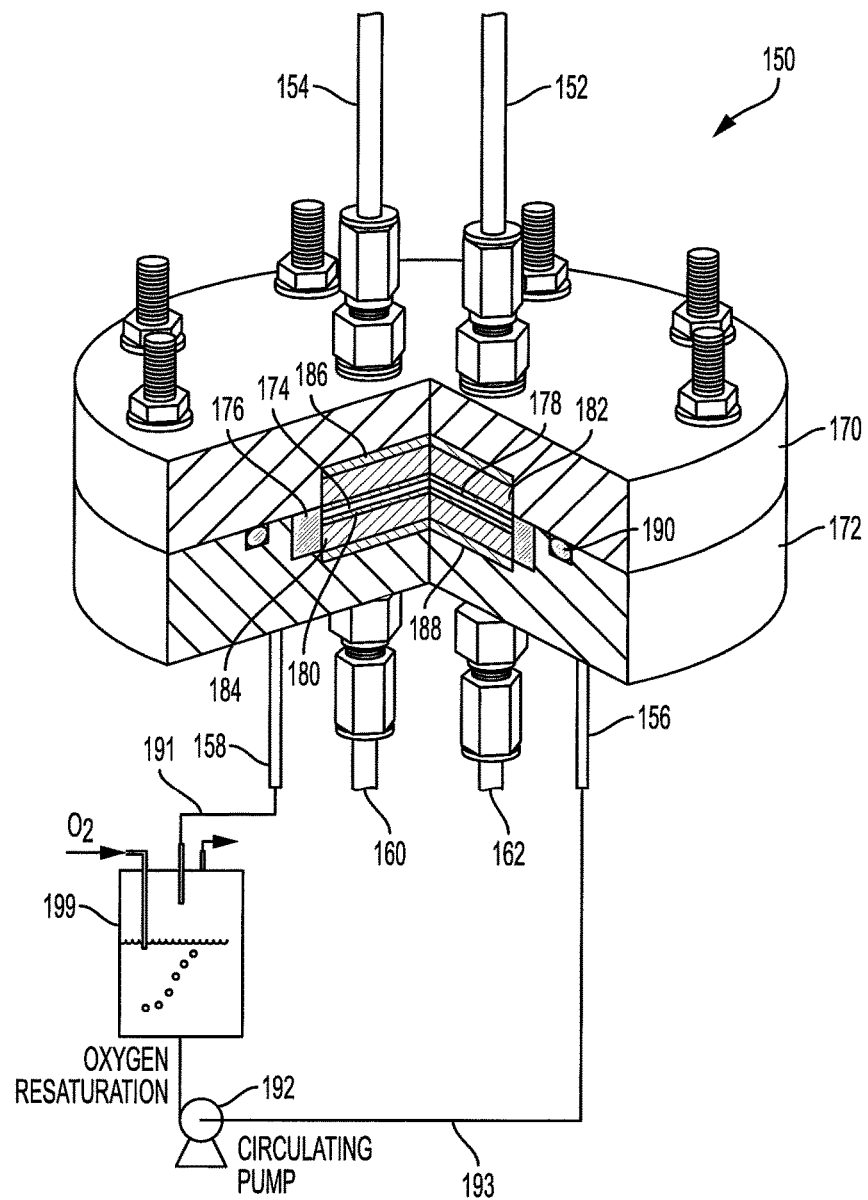

Block diagrams of examples of the presently described embodiments are given in FIGS. 1A and B, and drawings of more detailed implementations are shown in FIGS. 2B and 2B.

With reference to FIG. 1A, a fuel cell 10 is shown. Recirculating oxygen-saturated electrolyte 20 flowing through a liquid channel or flow path 30 to enhance the maximal current observed in the fuel cell 10 is illustrated. Also shown are a channel inlet portion 32, a channel outlet portion 34, a fuel inlet 36, a diffuser 38 and a fuel outlet 40. The diffuser 38 is, in at least one form, formed of a porous material. Such a porous material may take a variety of forms including a porous plastic such as PTFE or polyimide, a porous ceramic such as $Al_2O_3$, or a sintered glass. A membrane 42 (which may serve as a catalyst layer or catalyst support layer) separates the fuel 44 (e.g. a liquid/solid fuel such as a metal fuel) from the flowing electrolyte 20. The membrane may take a variety of suitable forms. Further illustrated is a solid (impermeable) body 46 that could comprise a variety of different suitable materials such as PTFE or appropriate plastic, metal, metal alloy with a non-conductive passivating coating, or a ceramic. A mechanism 12 configured to circulate the liquid electrolyte through the fuel cell (e.g. through the channel) and saturate (e.g. continually saturate) the liquid electrolyte with oxygen/oxygen ions (or a fuel, in some forms) is also a part of the contemplated fuel cell system. Such a mechanism 12 may take a variety of forms that will be apparent to those of ordinary skill in the art but is, in at least one form as representatively shown, configured to provide oxygen-saturated liquid electrolyte to the channel inlet portion 32 through line 15 and receive the oxygen-depleted liquid electrolyte from the channel outlet portion 34 through line 13 during the circulation/recirculation. In at least one form, the mechanism 12 is also provided with a pump 14 to facilitate the circulation/recirculation process. However, other configurations facilitating flow may also be used. In operation, the use of an oxygen saturated electrolyte ensures that the reaction kinetics of the oxygen reduction reaction are fast and the use of convection moderates concentration gradients and the diffusion-limited maximum current density. The oxygen ion is generated in-situ by the reduction of the oxygen dissolved in the electrolyte. Alternatively, oxygen ions can be generated ex-situ and incorporated into the flowing electrolyte at sufficient concentrations necessary to obtain desired performance of the fuel cell during operation.

Figure 1B:
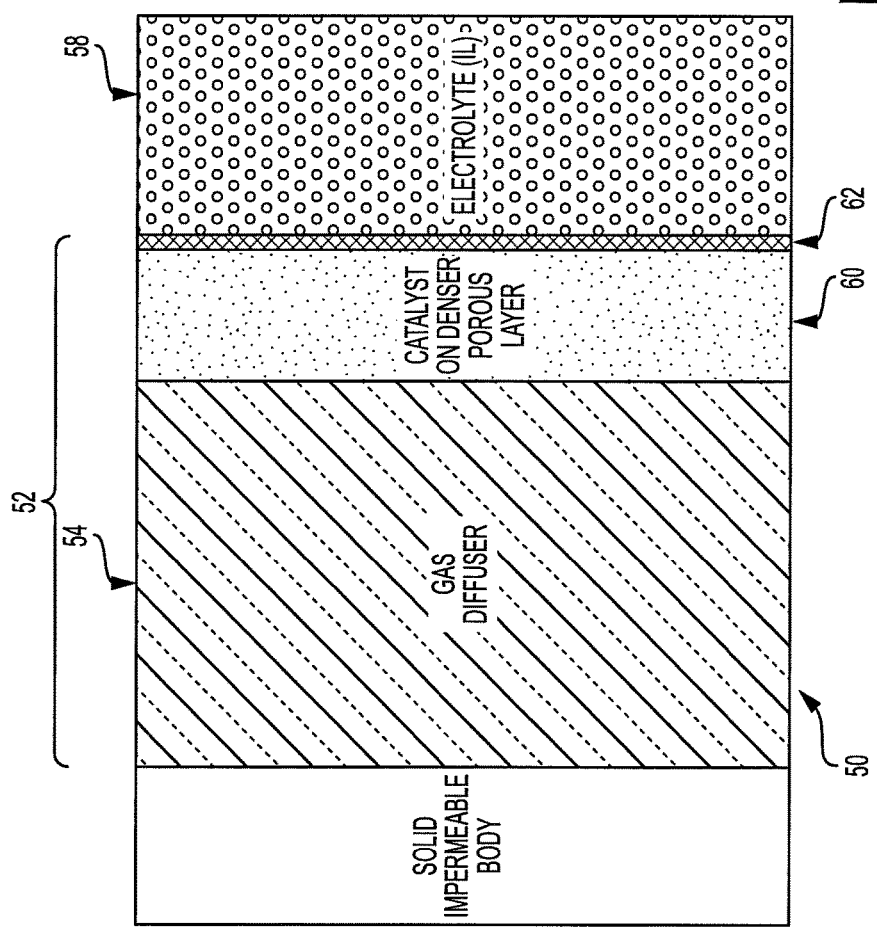

With reference to FIG. 1B, a section 50 which could be optionally or alternatively implemented in FIG. 1A includes a dual porosity membrane structure 52 to allow the uniform flow of fuel (e.g., gaseous methane) through a gas diffuser 54 on the fuel side, without allowing phase mixing of the gaseous fuel with a liquid electrolyte 58. In one form, a gaseous fuel such as methane is flowed through the porous gas diffuser 54 (e.g., with 5-100 micron diameter pores) having a thickness, e.g. approximately 5 millimeters. The gas diffuser 54 is bonded to a nanoporous layer 60. The nanoporous layer 60 is coated with a catalyst 62. The nanoporous layer can have a thickness of any suitable value but, in one form, is approximately 50 microns. The catalyst coating 62 likewise has a thickness that can vary but, in one form, is approximately 1 micron. The nanoporous layer 60 can have a fixed pore size (5 nm-10 micron diameter) and may be surface-modified to be non-wetted by the electrolyte through appropriate low surface energy coatings 62 such as Teflon (PTFE), or other non-wettable or non-stick coatings. The capillary pressure for liquid intrusion into the gas phase is quite large, estimated to be 1-10 psi. This larger pressure differential can make it easier to control the fluctuations in gas/liquid velocity which might otherwise lead to two phase mixing of the fuel and electrolyte, possible flooding of the catalyst, and a loss of the overall fuel cell performance.

More particularly, previous systems using a flowing electrolyte typically make use of a solid/liquid fuel. However, such designs do not have a barrier between the electrolyte and fuel phase, which can lead to high crossover rates and phase mixing/flooding. As noted, FIG. 1B shows a dual porosity catalyst/gas diffuser layer. The high pore size (5-100 micron diameter) gas diffuser 54 allows for high flowrates of the gas phase, and lowers the pressure drop in the gas phase. The catalyst layer comprises an nanoporous layer 60 such as anodized aluminum oxide (AAO) template or porous polymer such as Teflon, PTFE (e.g., expanded or porous polytetrafluoroethylene), or polyimide (e.g., porous Kapton), or porous ceramic (e.g., porous alumina or porous zirconia), onto which the catalyst 62 is deposited (e.g., by sputtering, solution deposition, hot pressing, etc.). The AAO template has a tightly controlled pore size (5 nm-10 micron diameter). When the surface of the nanoporous layer 60 is appropriately modified to make it non-wett-able by the electrolyte, by adding or coating the catalyst layer 62, the resulting repulsion of electrolyte from entry into the pores can act as a sufficient barrier to prevent the mixing of the electrolyte and fuel phases and can sufficiently account for fluctuations in the fuel/gas flow. This concept extends beyond DHCFCs to other fuels as well (e.g. $H_2$, other gaseous hydrocarbons). Further, the dual porosity layer can also be used for the flow of liquid fuels (e.g. methanol, ethanol, etc.) and prevent phase mixing in a similar manner as described for the gas diffuser/catalyst assembly—by selecting appropriate pore size that enables the achievement of the desired pressure gradients and profiles at the gas-liquid interface along the flow channel(s).

The electrolyte that is implemented with the presently described embodiments may take a variety of suitable forms. In at least one embodiment, the electrolyte is an ionic liquid. For example, the ionic liquid may comprise at least one of 1-ethyl, 3-methyl imidazolium trifluoromethanesulfonate [emim][OTf], 1-ethyl, 3-methyl imidazolium bis(trifluoromethylsulfonylimide) [emim][TFSI], butyl trimethylammonium bis(trifluoromethylsulfonylimide) [btma][TFSI], 1-propyl, 3-methylpyrrolidinium bis(trifluorosulfonylimide) [pmpy][TFSI], 1-butyl, 3-methylpyrrolidinium bis(trifluorosulfonylimide) [bmpy][TFSI], 1-ethyl-3-methylimidazolium dicyanamide [emim][-DCA], 1,2-dimethyl-3-propylimidazolium bis(trifluoromethylsulfonyl)imide [mmpim] [TFSI], and 1-ethyl-2,3-dimethylimidazolium bis trifluoromethylsulfonyl)imide.

With reference to the exploded view of FIG. 2A, an implementation 100 incorporating both embodiments shown in FIGS. 1A and 1B is shown. The implementation 100 includes a cathode side 102 and an anode side 104. The cathode side 102 comprises a metal layer or connector 106, a catalyst layer 108 (including dual porosity feature such as that shown in connection with elements 60 and 62 of FIG. 1B) and porous diffuser 110. The anode side 104 comprises a metal layer 112, a catalyst layer 114 (having a similar structure as catalyst layer 108) and a porous diffuser 116. The implementation 100 is also provided with an electrolyte distributor or manifold 118 which may take a variety of forms. The flow or the source of electrolyte is illustrated here although such flow may be implemented in any of a variety of manners using the electrolyte distributor 118. A mechanism 140 configured to circulate the liquid electrolyte through the fuel cell (e.g. through the channel) and saturate (e.g. continually saturate) the liquid electrolyte with oxygen/ oxygen ions (or a fuel, in some forms) is also a part of the contemplated fuel cell system. Such a mechanism 140 may take a variety of forms that will be apparent to those of ordinary skill in the art but is, in at least one form as representatively shown, configured to provide oxygen-saturated liquid electrolyte to the channel inlet portion or distributor 118 through line 143 and receive the oxygen-depleted liquid electrolyte from the channel outlet portion or distributor 118 through line 141 during the circulation/recirculation. In at least one form, the mechanism 140 is also provided with a pump 142 to facilitate the circulation/recirculation process. However, other configurations facilitating flow may also be used.

Supplemental oxygen flow into the system (not shown in FIGS. 1A and 1B) may also be provided at 120 and 122, for example. Fuel flow is shown at 124 and 126. Also shown is a gasket 128.

FIG. 2B illustrates a cut-away view of a further implementation 150—having fuel inlet 152, fuel outlet 154, channel inlet 156 and channel outlet 158. Also shown are supplemental oxygen flow channels 160 and 162. The implementation 150 also includes solid impermeable body portions 170 and 172 that house a variety of components defining the presently described embodiments. For example, the flow channel 174 is supplied with electrolyte fluid through electrolyte distributor 176. The channel 174 is lined by catalyst layers 178 and 180 (which comprise a dense porous layer and a catalyst layer) and less dense porous layers 182 and 184, respectively. Also shown are gaskets 186, 188 and 190. Also shown is a mechanism 199 configured to circulate the liquid electrolyte through the fuel cell (e.g. through the channel) and saturate (e.g. continually saturate) the liquid electrolyte with oxygen/oxygen ions (or a fuel, in some forms) that is also a part of the contemplated fuel cell system. Such a mechanism 199 may take a variety of forms that will be apparent to those of ordinary skill in the art but is, in at least one form as representatively shown, configured to provide oxygen-saturated liquid electrolyte to the channel inlet 156 and distributor 176 through line 193 and receive the oxygen-depleted liquid electrolyte from the channel outlet port 158 and distributor 176 through line 191 during the circulation/recirculation. In at least one form, the mechanism 199 is also provided with a pump 192 to facilitate the circulation/recirculation process. However, other configurations facilitating flow may also be used.

In operation, the systems described herein may be used to implement method(s) according to the presently described embodiments. In this regard, a method for use in an electrochemical fuel cell system employing the use of a fuel for electrochemical energy conversion and at least one fuel cell, comprises receiving a liquid electrolyte in a saturated state, facilitating a flow of the liquid electrolyte in a flow path and allowing for an exit of the flowing liquid electrolyte in a depleted state.

Figure 3:
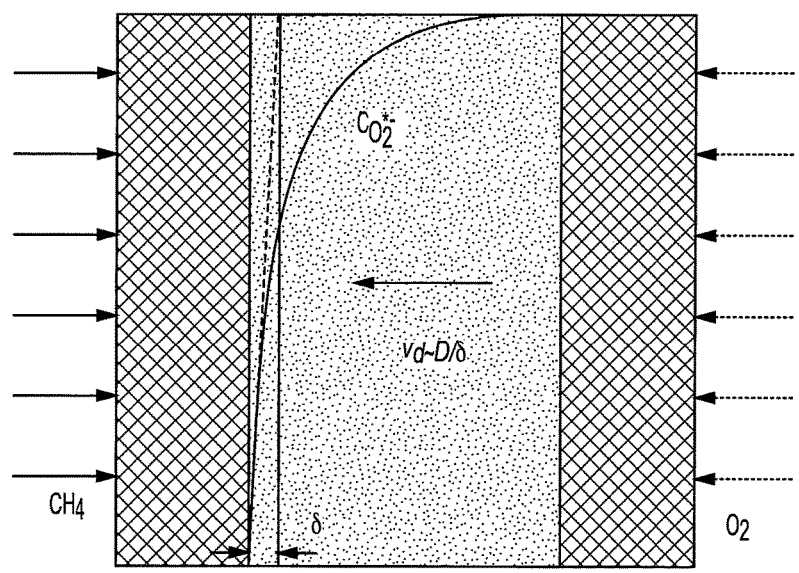
FIG. 3 is a schematic diagram of a diffusional process in a fuel cell.

FIGS. 3-10, and the accompanying discussion, explain the bases, selected parameters and characteristics, and experimental data that may be useful in realizing implementation of the presently described embodiments. With reference to FIG. 3, and to further explain the embodiment of FIG. 1(b), it should be appreciated that the characteristic diffusional velocity ($v_d$) of the active oxygen ionic species is proportional to the ratio of the diffusivity (D) and thickness of the diffusional boundary layer ($\delta$). In this regard, a diffusional boundary layer of thickness $\delta$ exists in the electrolyte on account of depletion of the mobile species (oxide/superoxide/peroxide ions) from their steady-state value in the bulk electrolyte ($C_{bulk}$). As a result, the mass-transfer limited current ($I_{max}$) in the fuel cell is proportional to the diffusional velocity ($V_D = D/\delta$) given below:

$$I_{max} = zFC_{bulk}v_d$$

where z is the valency, F is Faraday's constant. The above equation places a strict limit on the current delivering capability of the cell. However, the oxygen reduction reaction (ORR) in fuel cell is characteristically sluggish, likely due to the slow adsorption of oxygen onto the surface of most catalytic materials. In such a case, it may be possible to accelerate the reaction rate by facilitating the oxygen to be available through an oxygen-saturated electrolyte, which is another aspect of the current invention. Thus, in the case when the overall current delivering capability of the fuel cell is limited by the availability of the oxygen ions in the electrolyte, the maximum current could be improved significantly by using a flowing electrolyte that is always maintained in a state of maximum oxygen/oxygen ion saturation. Additionally, convective mass transfer helps ameliorate concentration gradients/barriers within the bulk electrolyte, which further helps improve the current-delivering ability of the fuel cell. The maximum current in a rectangular flow cell (Leveque solution for mass-transfer limited flow, Electrochemical Systems, John Newman) is directly dependent on the electrolyte flow velocity, and is expressed below:

$$I_{max}=1.85zFC_{bulk}v_d(Re \cdot Sc \cdot d/L)^{1/3}$$

where Re is the Reynolds number, Sc is the Schmidt number and d/L is the channel aspect ratio. Thus, it is clear that the use of convective flow could offer an enhancement of the characteristic ionic velocity/flux, and hence have a direct impact on the maximum current delivering capability of the fuel cell.

The cell reactions in a DHCFC running on methane (natural gas) as fuel are hypothesized to proceed by either of the pathways given below: Complete combustion:

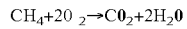

Cathode:

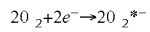

Anode:

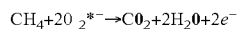

Incomplete Combustion:

$$2CH_4+3O_2 \rightarrow 2CO+4H_2O$$

Cathode:

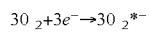

Anode:

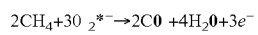

The reaction scheme assumes that superoxide ions are the mobile species that are created at the cathode and migrate to the anode. The buildup of reaction products (e.g., CO and $CO_2$) in the fuel cell can cause a progressive degradation of the electrolyte by lowering the oxygen carrying capability, and hence the maximal current provided by the fuel cell. The buildup of CO can potentially deactivate the catalyst and the buildup of $CO_2$ can displace the oxygen present in the solution, which could have the effect of hindering the ORR kinetics. The flowing electrolyte aids in the continual removal of detrimental products and prevents deterioration of fuel cell performance. This might happen by any one of the following ways:

(i) Displacement of oxygen dissolved in the electrolyte
(ii) Chemical reaction with the superoxide to form the carbonate ion (Casadei et al, J. of Organic Chemistry, 1996), given below:

$$2CO_2+2O_2^{*-} \rightarrow [C_2O_6]^{2-}+O_2$$

Figure 4:
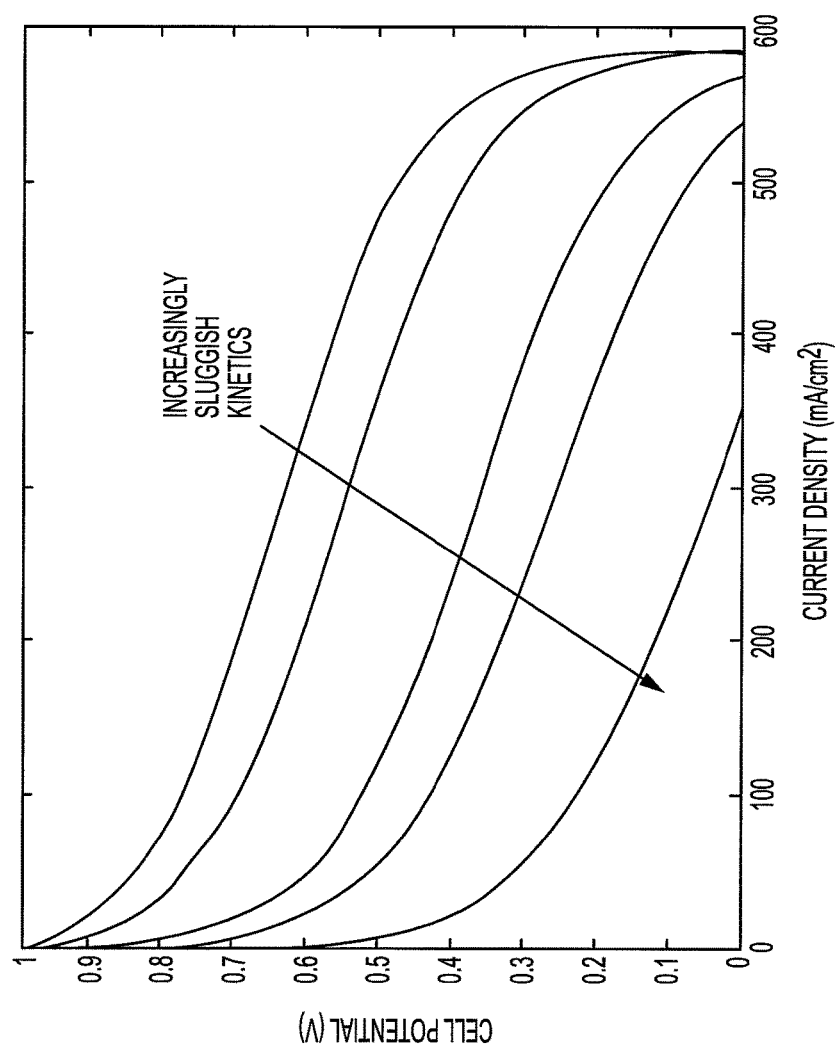
FIG. 4 is a simulated plot of I-V curves in an intermediate temperature fuel cell.
Figure 5A:
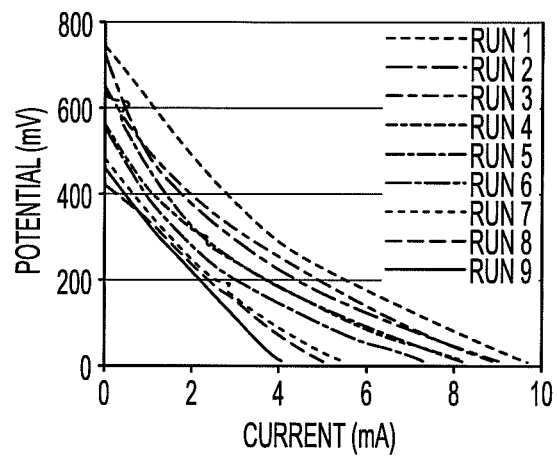
FIGS. 5A and 5B are plots of fuel cell performance characteristics in a fuel cell operating at 220° C.
Figure 5B:
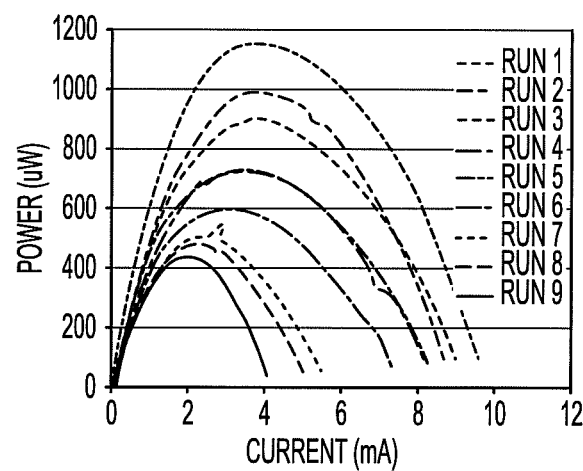
Figure 6:
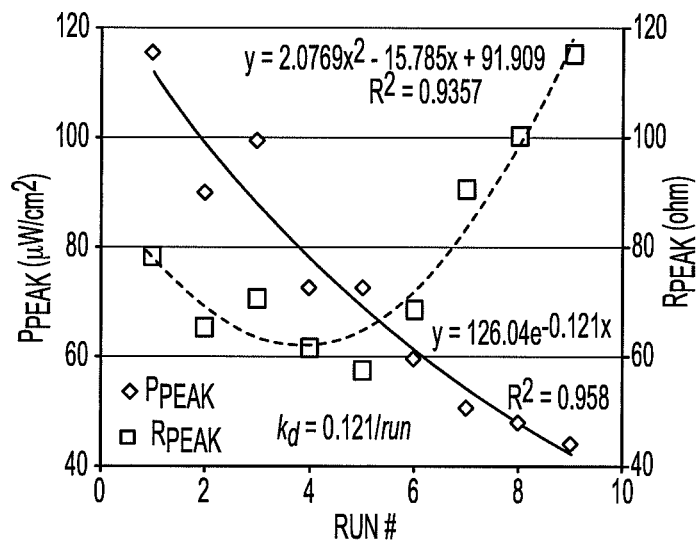
FIG. 6 is a plot of peak specific power and resistance at peak power indicating the exponential decay in a non-recirculated fuel cell.

The exchange current density ($i_0$) and ionic conductivity can similarly be affected by the loss of the active species, and the current versus voltage (I-V) characteristics of the cell can show an increasingly sluggish performance (FIG. 4—simulations, FIG. 5—experimental data). FIG. 4 shows that current delivering ability of the system decreases on each cycle on account of increasingly sluggish reaction kinetics and reduced mass transfer. FIGS. 5A, 5B and FIG. 6 show results for an experimental fuel cell operating at 220° C.—which are used as the baseline values for comparing against a DHCFC flow type device according to the presently described embodiments.

An exponential degradation in the peak power output (an important performance metric) is observed, with a decay rate calculated to be $k_d$=0.121/run (solid line, FIG. 6). As shown, the peak power in a stagnant fuel cell degrades to one half of the initial value after only 8 cycles. The removal of the reaction products is critical to preventing performance degradation over the lifetime of the fuel cell. Presumably, a flowing electrolyte fuel cell wherein the electrolyte is continuously refreshed would not suffer from degradation in performance over time as the reaction products would not build up in the electrolyte in contrast to a stagnant electrolyte fuel cell.

Figure 7:
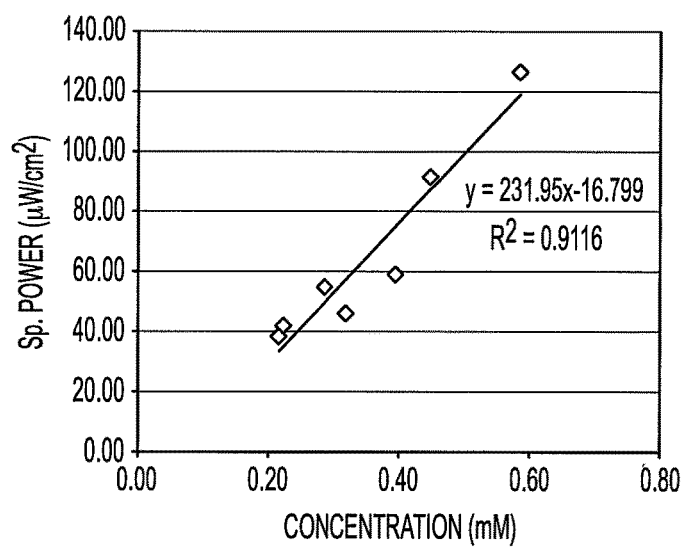
FIG. 7 is a plot of peak power and bulk $O_2$ concentration in different ionic liquids.

Electrochemical impedance spectroscopy (EIS) experiments were performed to determine the oxygen concentration in this stagnant electrolyte fuel cell design and compared with the degradation in peak power. The EIS response was fitted to a Randles equivalent circuit model comprising a series resistance ($R_s$), charge-transfer resistance ($R_{ct}$), double-layer capacitance ($C_{dl}$) and finite Warburg diffusional elements ($Z_w$). The oxygen concentration and diffusivities were obtained from the values of the series elements using the reactions given below:

$$C_{dl} = \epsilon_0 \epsilon_r / \delta$$

$$\tau \frac{2}{d} = \delta^2 / D$$

$$A_w = RT \Big/ \left( z^2 F^2 C_{bulk} \sqrt{2D} \right)$$

where $C_{dl}$ is the specific double-layer capacitance, $\tau_d$ is the characteristic diffusional timescale and $A_w$ is the Warburg coefficient. The value of the boundary layer thickness was estimated using literature value of the dielectric constant ($\epsilon_r$). The peak power is linearly correlates with the estimated oxygen concentration (FIG. 7), implying that the performance characteristics of the fuel cell could be significantly enhanced by enhancing the availability of oxygen. In FIG. 7, a plot is shown of peak power and bulk $O_2$/oxygen ion concentration in different ionic liquids. The bulk concentration was estimated from electrochemical impedance spectroscopy measurements prior to each run.

Figure 8A:
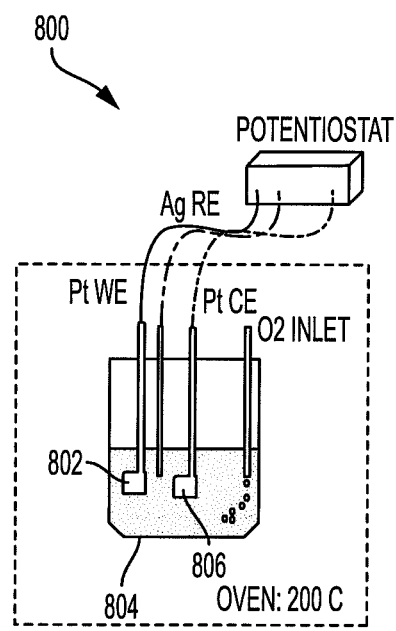
FIG. 8A is a symmetric cell set-up and FIG. 8B is a cyclic voltammogram of the oxygen redox reaction in an $O_2$ saturated symmetric cell.
Figure 8B:
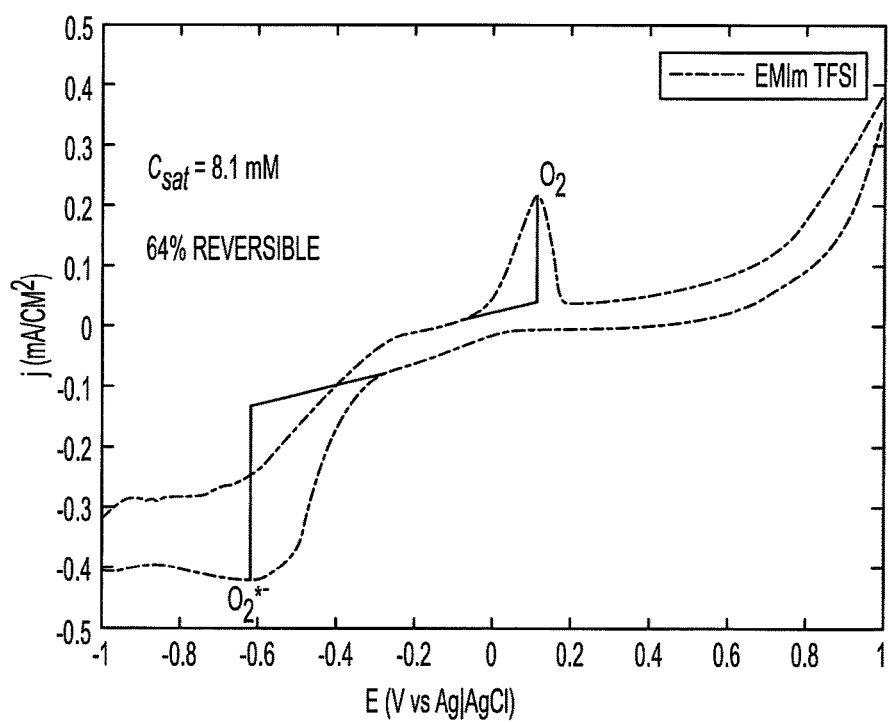

Referring to FIGS. 8A and 8B, an oxygen-saturated symmetric cell 800 was fabricated utilizing Pt electrodes 802 and 806 immersed in the ionic liquid 804. The oxygen concentration was determined to be 8.1 mM (milli molar) from the peak current in a cyclic voltammogram using the Randles-Sevcik equation, given below.

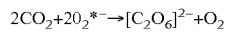

where V is the scan rate (5 mV/s for this experiment). When compared with the stagnant electrolyte fuel cell design discussed above, it was also determined that the oxygen concentration in a stagnant electrolyte cell is in fact much lower than that in a symmetric oxygen-saturated cell where the saturation is carried out by sparging (bubbling) oxygen gas through the electrolyte for one hour, prior to testing, in contrast to the stagnant electrolyte cell where the oxygen is incorporated by merely flowing it over the stagnant electrolyte film immobilized into a porous support. As explained above, for the case of the baseline ionic liquid (EMIm TFSI), the oxygen concentration at saturation is 20× higher than the value observed in the stagnant electrolyte design (FIGS. 8A and 8B). More specifically, the peak reduction current corresponds to a saturation concentration of 8.1 mM, which is 20× larger than the value of 0.4 mM observed in the stagnant electrolyte fuel cell using the same electrolyte (i.e. EMIm TFSI) as shown in FIG. 7.

This suggests that it may be possible to offer a linear increase in performance by saturating the electrolyte with oxygen prior to running the fuel cell experiment.

The theoretical cell potential of the fuel cell is obtained by balancing the redox reactions occurring at each electrode at equilibrium, given below.

Anode:

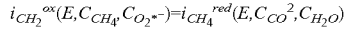

Cathode:

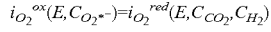

Where $i_{CH_2}^{ox}$ and $i_{CH_4}^{red}$ respectively are the oxidation and reduction current, resulting from the contributing to the concentration and potential-dependent reversible reaction ($CH_4 + O_2^{*-} \rightleftharpoons CO_2 + H_2O + e^-$) occurring at the anode (fuel-side). Similarly, $i_{O_2}^{ox}$ and $i_{O_2}^{red}$ respectively are the oxidation and reduction, resulting from the reversible redox reaction ($O_2 + e^- \rightleftharpoons O_2^{*-}$) occurring at the cathode.

The presence of dissolved oxygen at both electrodes (anode and cathode) leads to the development of a mixed cell potential at the anode on account of the oxygen reduction reaction, given below. It is important to note that the oxygen evolution reaction is not favored at this potential, and is omitted from the anodic potential calculations.

Anode:

$$i_{CH_2}^{ox}(E, C_{CH_4}, C_{O_2^{*-}}) = i_{CH_4}^{red}(E, C_{CO}^2, C_{H_2O}) + i_{O_2}^{red}(E, C_{O_2})$$

Figure 9A:
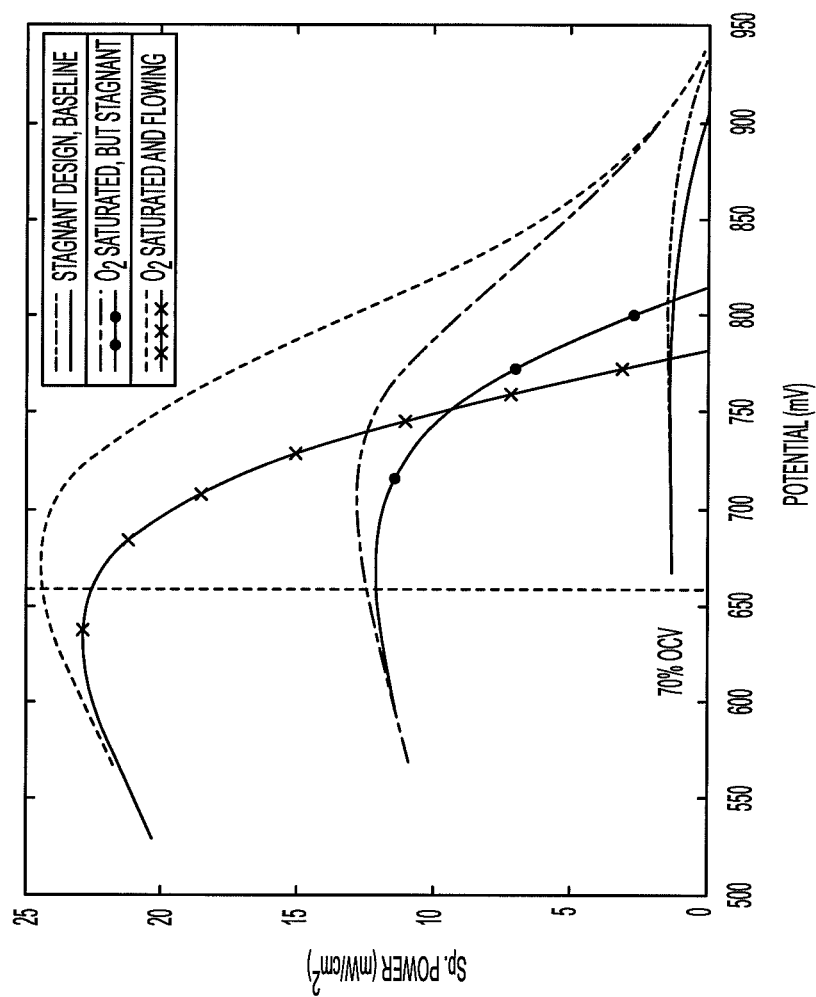
FIGS. 9A and 9B are simulated comparisons of fuel cell characteristics of flowing electrolyte design with stagnant electrolyte based designs.
Figure 9B:
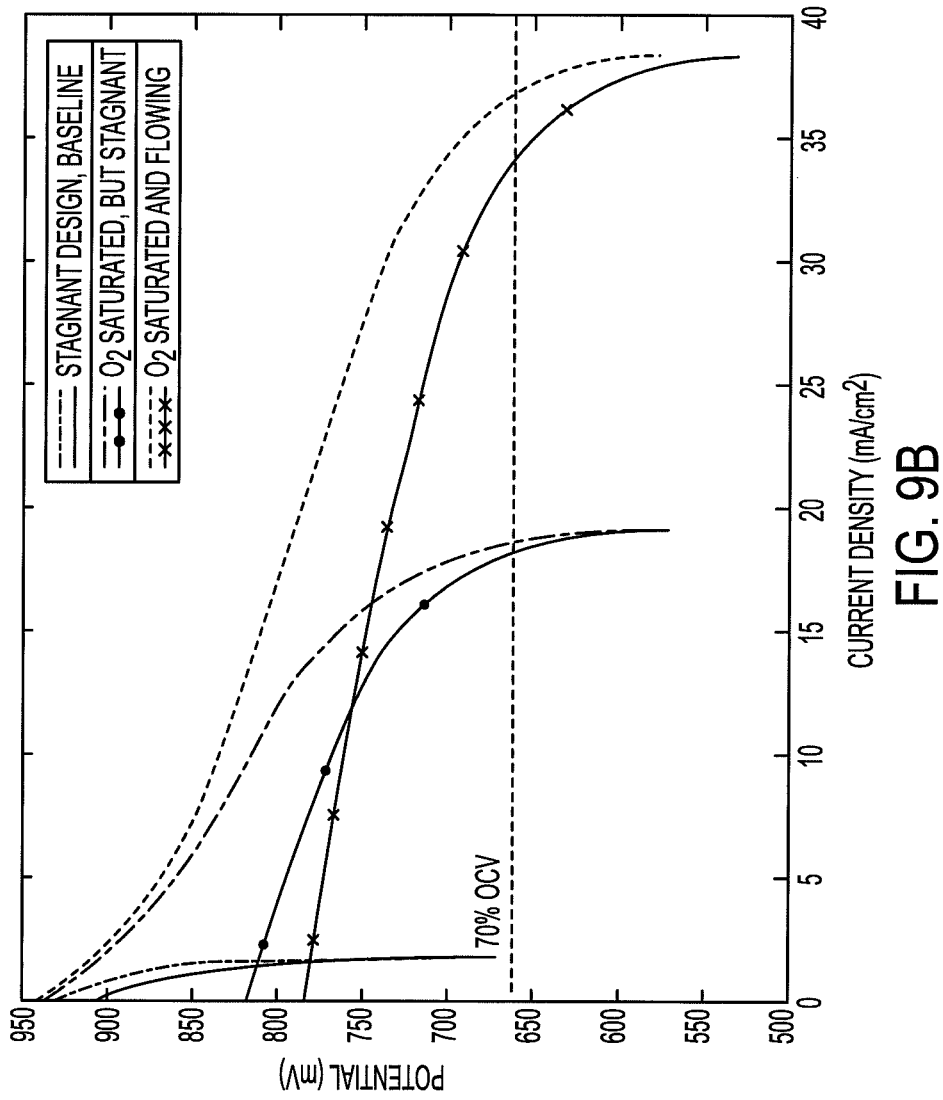

Assuming that the fuel reaction kinetics and transport are substantially faster (>5×) than the ORR, the mixed potential at the anode results in a concentration-dependent loss up to 200 mV while the specific power delivered by the cell can be substantially enhanced (5×) in the cell potential. This assumption is a valid one since ORR kinetics are significantly slower than the hydrocarbon oxidation reaction (HOR). However, if there were a condition where the performance was limited by the anode (fuel), it may be possible to improve performance by saturating the electrolyte with the fuel instead of oxygen. As shown in FIGS. 9A and 9B, this loss is offset by the significantly larger gain in current density, demonstrated by the simulated curves of current density and specific power. Notably, the $O_2$-saturated flowing electrolyte design has higher specific power and peak current density. The bold lines represent the mixed potential system.

Additionally, even this small loss of potential can be eliminated by the use of a selective catalyst on the anode (e.g., Palladium or Nickel or Nickel-Graphene at anode) versus the cathode (e.g., Platinum or Glassy Carbon at the cathode). By selecting an anode catalyst that is not as selective to the cathodic reaction, the mixed potential loss is reduced and thereby the fuel cell performance can be further improved. In this case, the current density and specific power plots are shown by the dotted lines. It is also demonstrated that the effect of the mixed potential is strongest close to the open circuit potential and this effect is not as significant when compared at peak power and maximum current density (i.e. 70% of OCV).

Figure 10:
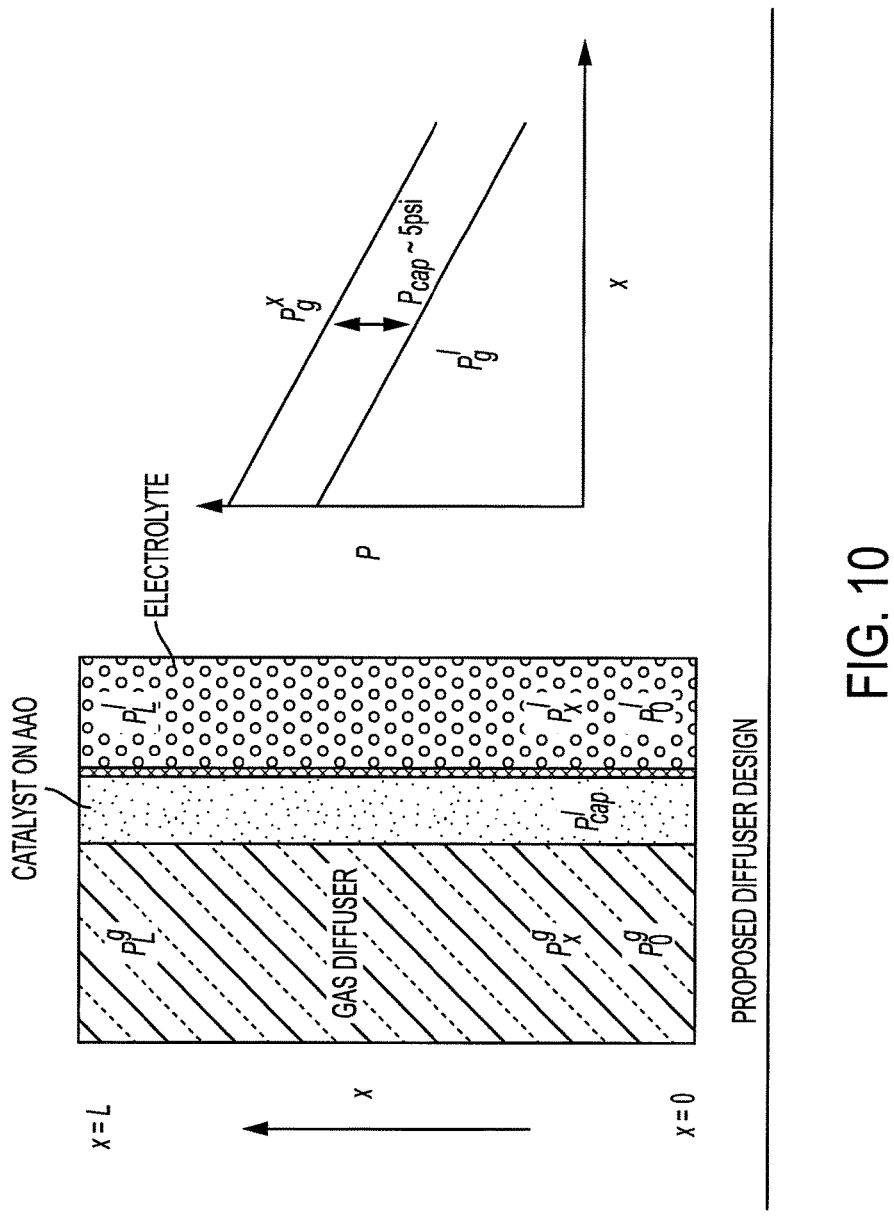
FIG. 10 is a plot showing the pressure differential between the electrolyte and the fuel phase along the flowing path of the electrolyte.

With respect to the features of the embodiment shown in FIG. 1(b), FIG. 10 shows a pressure differential between electrolyte and fuel phase compared with the capillary pressure. A single porosity design is an unstable system prone to phase mixing as it may not be possible to maintain the pressure drops for the gas and liquid phases, as desired. However, a dual porosity design, and additionally, with the appropriate surface modification to make the surface non-wettable, allows the capillary pressure and surface non-wettability to act as a pressure buffer (1-10 psi) and prevent the mixing of fuel and electrolyte phases, and plausibly also maximize the 3-phase gas/electrolyte/catalyst contact area. That is, a dual porosity design allows the denser 'skin' to act as a buffer/barrier.

In order to maintain an appropriate gas-liquid interface along the electrolyte flow path, a dual porosity catalyst/gas diffuser layer can be used. The highly porous (e.g., 10-100 micron pore size) gas diffuser allows for high flowrates of the gas phase, and lowers the pressure drop in the gas phase. The catalyst layer can comprise a denser porous 'skin' with pore size and/or overall porosity lower than the gas diffuser (e.g., anodic aluminum oxide (AAO) template or a porous Teflon or expanded Teflon-ePTFE membrane, or an aerogel material with a nanoporous structure), onto which the catalyst material is deposited.

The denser porous skin can have a tightly controlled pore size (5-1000 nm diameter). As a result this 'dense porous skin' on the electrolyte side of the more porous gas diffuser can act as a barrier to prevent the mixing of the electrolyte and fuel phases and can sufficiently account for fluctuations in the fuel flow.

Additionally, appropriate surface energy treatment can further reduce the possibility of electrolyte intrusion into the fuel lines by making the dense porous skin with catalyst non-wettable by the electrolyte (contact angle>90°).

Under conditions of equal pressure drop in both phases along the flow direction, the design criteria for maintaining stable interface between the fuel and electrolyte flows and the governing equations are given below:

Equality of pressure in the electrolyte and gas-phase:

$$(\Delta P)_{fuel} = (\Delta P)_{elec}$$

Design criterion for fuel-phase and electrolyte phase flows through fuel cell:

$$P_g^x = P_l^x + P_{cap}^x \rightarrow P_{cap} \sim 5 \text{ psi for pore size } \sim 1 \text{ μm}$$

Kozeny-Carman Law (Gas phase flow in porous diffuser):

$$\frac{P_g^0 - P_g^L}{L} = \frac{180\mu}{\Phi_s^2 D_p^2} \frac{(1-\epsilon^2)}{\epsilon^3} v_g$$

Hagen-Poiseuille (Laminar flow of electrolyte in channel):

$$\frac{P_l^0 - P_l^L}{L} = \frac{8\mu L}{r_{hyd}} v_l$$

The advantages of the presently described embodiments include but are not limited to:

(i) Replenishment of active species (e.g., oxygen ions) in the electrolyte to enhance the rate of the fuel cell reaction and mitigation/elimination of concentration gradients;

(ii) Substantial improvement in maximum current density delivered by the fuel cell;

(iii) Substantial improvement in the peak specific power delivered by the fuel cell;

(iv) Flow-enhanced removal of reaction products from the electrolyte-electrode interface; and (v) Improvement in the longevity and performance of the fuel cell by avoiding degradation by removing a buildup of unwanted reaction products.

Variations or alternatives to the presently described embodiments include:

(i) Implementation of an intermediate-temperature hydrogen fuel cell using ionic liquids as a flowing electrolyte. This could be a viable membrane-less design alternative to proton exchange membrane (PEM) fuel cells that use hydrogen/other non-hydrocarbon fuels. The flow cell design could offer cost-effective enhancement in performance.

(ii) Use of a fuel cell stack employing the recirculation of electrolyte through multiple flow channels. In a further variation, the stack of fuel cells is electrically connected in a parallel configuration to maximize current delivering capability. In a still further variation, the stack of fuel cells is electrically connected in a series configuration to maximize voltage delivering capability. In a still further variation, the stack of fuel cells is electrically connected in a series-parallel combination configuration to achieve the desired voltage and current delivering capability.

(iii) Use of anodes in the form of a porous cylinder, with a dual porosity template bonded onto the same in a concentric configuration.

(iv) Implementation of a multi-electrode version of the cell proposed in (iii), with the anodes arranged in a desired pitch in an electrolyte tank.

(v) Use of a liquid fuel.

(vi) Use of a non-ionic liquid as the recirculating electrolyte.

(vii) Operation of the system in a range of approximately 100-400° C.

(viii) Operation of the system at an ambient temperature in a range of 0-100° C.

(ix) Use of a fuel cell with a fuel-saturated liquid electrolyte (instead of oxygen-saturated)—to conduct appropriate fuel ions towards the cathode.

(x) Use of oxygen or a similarly oxidizing gas to saturated the electrolyte.

Also, these embodiments associated with the presently described embodiments, are extensible to metal-air battery systems, to optimize their energy storage capability and make use of the same mechanical and electrochemical considerations as the DHCFC systems described.

Further, the embodiments are also applicable to an electrochemical energy conversion system including at least one rechargeable battery wherein the at least one rechargeable battery comprises an inlet portion configured to receive liquid electrolyte in a saturated state, a flow path configured to facilitate a flow of the liquid electrolyte and an outlet portion configured to provide an exit for the flowing liquid electrolyte in a depleted state. Such as system may also comprise a rechargeable battery using metal as the fuel and utilizing an oxygen-saturated flowing electrolyte as the liquid electrolyte.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A peroxide or superoxide-ion conducting electrochemical fuel cell system employing the use of a gaseous fuel for electrochemical energy conversion and at least one fuel cell, the at least one fuel cell comprising:
    an inlet portion configured to receive liquid electrolyte in an oxygen saturated state;
    a flow path configured to facilitate a flow of the liquid electrolyte;
    a dual-porosity gas permeable membrane configured to allow uniform flow of the gaseous fuel on a fuel side of the at least one fuel cell and provide a barrier to the liquid electrolyte to prevent phase mixing of the gaseous fuel with the liquid electrolyte; and,
    an outlet portion configured to provide an exit for the flowing liquid electrolyte in a depleted state.

2. The system as set forth in claim 1 wherein the liquid electrolyte is saturated with at least one of oxygen or oxygen ions.

3. The system as set forth in claim 1 further comprising a mechanism configured to saturate the liquid electrolyte with oxygen, provide the oxygen-saturated liquid electrolyte to the inlet portion, and receive the oxygen-depleted liquid electrolyte liquid from the outlet portion.

4. The system as set forth in claim 1 wherein oxygen ions are generated in-situ and incorporated into the flow of the liquid electrolyte.

5. The system set forth in claim 1 wherein carbon-containing products of fuel cell reaction ($CO_x$, x=1, 2) are dissolved in the liquid electrolyte and carried away for carbon capture and sequestration.

6. The system as set forth in claim 1 wherein the membrane comprises a porous gas diffuser bonded to a catalyst-coated nanoporous layer.

7. The system as set forth in claim 6 wherein the gas diffuser has pores with diameters in a range of approximately 5-100 microns.

8. The system as set forth in claim 7 wherein the gas diffuser has a thickness of approximately 5 millimeters.

9. The system as set forth in claim 6 wherein the catalyst-coated nanoporous layer has pores with diameters in a range of approximately 5 nanometers to 10 microns.

10. The system as set forth in claim 6 wherein the catalyst-coated nanoporous layer comprises a nanoporous layer having a thickness of approximately 50 microns and a coating layer of approximately 1 micron.

11. The system as set forth in claim 6 wherein the nanoporous layer comprises at least one of an anodized aluminum oxide, a porous polymer including PTFE (polytetrafluoroethylene), expanded or porous PTFE (polytetrafluoroethylene), a polyimide including porous polyimide, or a porous ceramic including porous alumina or porous zirconia.

12. The system as set forth in claim 6 wherein the nanoporous layer is surface treated to be nonwett-able by the electrolyte.

13. The system as set forth in claim 10 wherein the coating layer comprises PTFE (polytetrafluoroethylene) or a non-stick type coating.

14. The system as set forth in claim 1 wherein the electrolyte is an ionic liquid.

15. The system as set forth in claim 14, wherein the ionic liquid is at least one of 1-ethyl, 3-methyl imidazolium trifluoromethanesulfonate [emim][OTf], 1-ethyl, 3-methyl imidazolium bis(trifluoromethylsulfonylimide) [emim][TFSI], butyl trimethylammonium bis(trifluoromethylsulfonylimide) [btma][TFSI], 1-propyl, 3-methylpyrrolidinium bis(trifluorosulfonylimide) [pmpy][TFSI], 1-butyl, 3-methylpyrrolidinium bis(trifluorosulfonylimide) [bmpy][TFSI], 1-ethyl-3-methylimidazolium dicyanamide [emim][-DCA], 1,2-dimethyl-3-propylimidazolium bis(trifluoromethylsulfonyl)imide [mmpim][TFSI],and 1-ethyl-2,3-dimethylimidazolium bis trifluoromethylsulfonyl)imide.

16. The system as set forth in claim 1 wherein an operating temperature is in a range of approximately 100-400° C.

17. The system as set forth in claim 1 comprising a stack of fuel cells.

18. The system as set forth in claim 17 wherein the stack of fuel cells is electrically connected in a series-parallel combination configuration to achieve the desired voltage and current delivering capability.

19. A peroxide or superoxide-ion conducting electrochemical fuel cell system employing the use of a gaseous fuel for electrochemical energy conversion and at least one fuel cell, the at least one fuel cell comprising:
- a fuel inlet;
- a fuel outlet;
- and,
- dual-porosity gas permeable membrane configured to allow uniform flow of the gaseous fuel between the fuel inlet and fuel outlet and provide a barrier to a flowing oxygen saturated liquid electrolyte to prevent phase mixing of the gaseous fuel with the liquid electrolyte.

20. The system as set forth in claim 19 wherein the membrane comprises a porous gas diffuser bonded to a catalyst-coated nanoporous layer.

21. The system as set forth in claim 20 wherein the gas diffuser has pores with diameters in a range of approximately 5-100 microns.

22. The system as set forth in claim 20 wherein the gas diffuser has a thickness of approximately 5 millimeters.

23. The system as set forth in claim 20 wherein the catalyst-coated nanoporous layer has pores with diameters in a range of approximately 5 nanometers to 1 micron.

24. The system as set forth in claim 20 wherein the catalyst-coated nanoporous layer comprises a nanoporous layer having a thickness of approximately 50 microns and a coating layer of approximately 1 micron.

25. The system as set forth in claim 20 wherein the nanoporous layer comprises at least one of an anodized aluminum oxide, a porous polymer including PTFE (polytetrafluoroethylene), expanded or porous PTFE (polytetrafluoroethylene), a polyimide including porous polyimide, or a porous ceramic including porous alumina or porous zirconia.

26. The system as set forth in claim 20 wherein the nanoporous layer is surface treated to be nonwettable by the electrolyte.

27. The system as set forth in claim 24 wherein the coating layer comprises PTFE (polytetrafluoroethylene) or a non-stick type coating.

28. The system as set forth in claim 19 wherein the liquid electrolyte is an ionic liquid.

29. The system as set forth in claim 19 wherein an operating temperature is in a range of approximately 100-400° C.

* * * * *